United States Patent
Ogasa (10) Patent No.: US 9,266,780 B2
(45) Date of Patent: Feb. 23, 2016

(54) ALL SOLID STATE BATTERY WITH DENSIFICATION ADDITIVE

(75) Inventor: Kazuhito Ogasa, Kanagawa (JP)

(73) Assignee: OHARA INC., Sagamihara-shi (JP)

( * ) Notice: Subject to any disclaimer, the term of this patent is extended or adjusted under 35 U.S.C. 154(b) by 672 days.

(21) Appl. No.: 13/009,239

(22) Filed: Jan. 19, 2011

(65) Prior Publication Data

US 2011/0177397 A1    Jul. 21, 2011

(30) Foreign Application Priority Data

Jan. 19, 2010    (JP) ................. 2010-009515

(51) Int. Cl.
*H01M 10/05*    (2010.01)
*C04B 35/447*    (2006.01)
(Continued)

(52) U.S. Cl.
CPC .............. *C04B 35/447* (2013.01); *B32B 18/00* (2013.01); *C03C 3/062* (2013.01); *C03C 3/21* (2013.01); *C03C 10/00* (2013.01); *H01M 4/5825* (2013.01); *H01M 10/058* (2013.01); *H01M 10/0525* (2013.01); *H01M 10/0562* (2013.01); *C04B 2235/3203* (2013.01); *C04B 2235/3217* (2013.01); *C04B 2235/3232* (2013.01); *C04B 2235/3286* (2013.01); *C04B 2235/3287* (2013.01); *C04B 2235/3418* (2013.01); *C04B 2235/443* (2013.01); *C04B 2235/77* (2013.01); *C04B 2237/34* (2013.01); *C04B 2237/582* (2013.01); *Y02E 60/122* (2013.01); *Y02T 10/7011* (2013.01); *Y10T 29/49108* (2015.01)

(58) Field of Classification Search
USPC ........................................................... 429/322
See application file for complete search history.

(56) References Cited

U.S. PATENT DOCUMENTS

| 2005/0186474 A1* | 8/2005 | Jiang et al. ................. 429/209 |
| 2007/0048617 A1 | 3/2007 | Inda |

(Continued)

FOREIGN PATENT DOCUMENTS

| JP | 5-062680 A | 3/1993 |
| JP | 2006-185913 A | 7/2006 |

(Continued)

OTHER PUBLICATIONS

Notification of Reasons for Rejections dated Sep. 4, 2013, issued in corresponding Japanese Patent Application No. 2010-009515, with Partial translation (4 pages).

(Continued)

*Primary Examiner* — Ula C Ruddock
*Assistant Examiner* — Frank Chernow
(74) *Attorney, Agent, or Firm* — Westerman, Hattori, Daniels & Adrian, LLP (57) ABSTRACT

An all solid state battery having high output performance and a manufacturing method thereof are provided. The all solid state battery of the present invention comprises a negative electrode layer, a positive electrode layer, and a solid electrolyte layer having a lithium ion conductivity. At least one layer of the solid electrolyte, the positive electrode layer, and the negative electrode layer includes a lithium ion conductive crystal and $A_x B_y O_z$ (A is one or more selected from the group consisting of Al, Ti, Li, Ge, and Si. B is one or more selected from the group consisting of P, N, and C, wherein $1 \leq X \leq 4$, $1 \leq Y \leq 5$, and $1 \leq Z \leq 7$). The solid electrolyte material to which a preferable sintering additive is added in a predetermined ratio is densified by firing at relatively low temperature in the manufacturing process. The ion conductivity thereof is also high.

12 Claims, 2 Drawing Sheets

(51) Int. Cl.
*B32B 18/00* (2006.01)
*C03C 3/062* (2006.01)
*C03C 3/21* (2006.01)
*C03C 10/00* (2006.01)
*H01M 4/58* (2010.01)
*H01M 10/0525* (2010.01)
*H01M 10/0562* (2010.01)
*H01M 10/058* (2010.01)

(56) References Cited

U.S. PATENT DOCUMENTS

2007/0231704 A1* 10/2007 Inda .............................. 429/322
2009/0197172 A1 8/2009 Inda 2010/0216032 A1 8/2010 Baba et al.

FOREIGN PATENT DOCUMENTS

| | | |
|---|---|---|
| JP | 2007-005279 A | 1/2007 |
| JP | 2007-66703 A | 3/2007 |
| JP | 2007-294429 A | 11/2007 |
| JP | 2009-206087 A | 9/2009 |
| WO | 2008/143027 A1 | 11/2008 |

OTHER PUBLICATIONS

Japanese Office Action dated Nov. 19, 2013, issued in Japanese Patent Application No. 2010-009515, w/partial English translation.

* cited by examiner

ALL SOLID STATE BATTERY WITH DENSIFICATION ADDITIVE

CROSS REFERENCE TO RELATED APPLICATIONS

This application is based upon and claims the benefits of priorities from Japanese Patent Application No. 2010-009515 filed on Jan. 19, 2010, the entire contents of which are incorporated herein by reference.

FIELD OF THE INVENTION

The present invention relates to an all solid state battery and a method of manufacturing the all solid state battery, and relates to, in particular, a negative electrode of the all solid state battery and a method of manufacturing the negative electrode.

BACKGROUND ART

Recently, secondary batteries such as a high performance lithium battery for small electronic devices such as a handheld terminal and a mobile electronic device, fixed devices such as a small electric power storage device for home use, moving devices such as an electric motorcycle, an electric automobile, a hybrid electric automobile, and the like have become in demand more and more. Therefore, batteries having high capacity, but small size and light weight are desired and batteries having stable performance in various environments are also desired.

Therefore, among a lithium-ion secondary battery, a polymer battery utilizing polymer electrolyte (polyelectrolyte) constituted of polymer instead for electrolyte impregnated into microporous membrane has attracted an attention. Since a gelled electrolyte having liquid electrolytic solution impregnated into polymer macromolecule, the electrolytic solution is retained in the polymer macromolecule such that there is an advantage to improve the stability of the battery performance and to have higher flexibility to shape the battery. However, the polymer electrolyte has less mechanical strength. And the polymer electrolyte may be broken so as to cause a short circuit formed between the negative electrode and the positive electrode when the battery is assembled.

In such a background, an inorganic solid electrolyte and the like which contain inorganic substance including lithium ion conductive crystals but does not contain organic substance or the electrolytic solution have been investigated and developed (for example, Japanese Unexamined Patent Application Publication Nos. 5-62680 and 2006-185913). In such solid state battery, there is no fear of the liquid leakage and a high temperature heat resistance can be expected such that such solid state battery may be used in a wide temperature range.

SUMMARY OF THE INVENTION

However, the ion conductivity may not be high enough in such solid state battery utilizing the inorganic solid electrolyte or the like and it may be difficult to achieve a stably-high performance in the output. Moreover, the battery performance may deteriorate as the charge-discharge cycle is repeated. Therefore, in the present invention, it is an object to provide an all solid state battery having stable and high ionic conductivity and the battery properties which are less likely to deteriorate, and to provide a solid electrolyte layer, a positive electrode layer, and a negative electrode layer which are constituting components of the battery.

In view of the above-mentioned object, the present inventor conducted an intensive investigation and found that the solid electrolyte did not exhibit the properties of the material itself since densification might not have been enough in the negative electrode layer, he positive electrode layer, and the solid electrolyte layer including the solid electrolyte. Now, at least one of the solid electrolyte layer, the positive electrode layer, and the negative electrode layer was fired after an additive material capable of helping the densification was added such that the stable battery performance could be obtained. Further, it was found that at least one layer of the negative electrode layer, he positive electrode layer, and the solid electrolyte layer having been densified in this way has the solid electrolyte consolidated firmly such that it is unlikely that the battery properties deteriorate as the charge-discharge cycle is repeated over and over again.

Further features of the present invention, its nature, and various advantages will be more apparent from the accompanying drawings and the following description of the preferred embodiment.

DESCRIPTION OF THE PREFERRED EMBODIMENT

Although an embodiment of the present invention will be described in detail with reference to the drawings, the following description is provided to describe the embodiment of the present invention, and the present invention is not limited to the embodiment. And the same or related symbols are used to refer to the same or same kind of element and redundant description is omitted.

Embodiment 1

Pellets containing solid electrolyte including inorganic substance including a lithium ion conductive crystal were prepared and bulk density and ion conductivity thereof were evaluated with respect to an addition amount of a material constituted of compound including lithium.

(Preparation of Electrolyte)

As raw materials, $H_3PO_4$, $Al(PO_3)_3$, $Li_2CO_3$, $SiO_2$, and $TiO_2$ are employed. These materials were weighed out to provide a composition of 35.0% $P_2O_5$, 7.5% $Al_2O_3$, 15.0% $Li_2O$, 38.0% $TiO_2$, and 4.5% $SiO_2$, respectively in mol % as the mixture was placed in a platinum pot, and heated and fused for 4 hours while stirring a fused glass melt at a temperature of 1500° C. in an electric furnace. Thereafter, the glass melt was dripped into running water to obtain glass in a flake form. The thus-obtained glass was subject to a heat treatment at 950° C. for 12 hours such that crystallization might occur in order to obtain glass ceramics as the objective material. It was confirmed that the precipitated crystalline phase showed $Li_{1+x+y}Al_x Ti_{2-x}Si_yP_{3-y}O_{12}$ ($0 \leq x \leq 0.4$, $0 < y \leq 0.6$) crystal as the main crystalline phase by the powder X-ray diffractometry. Further, the lithium ion conductivity of the glass ceramics was about $1 \times 10^{-3}$ S/cm.

The thus-obtained glass ceramics in a flake form were milled by a jet mill, and the milled material was classified by a rotary roller made of zirconia (zirconium dioxide) such that powder glass ceramics having an average particle diameter of 20 μm was obtained. The thus-obtained powder was further milled by a planetary ball mill, an attritor, a bead mill, and the like such that powder lithium ion conductive glass ceramics having an average particle diameter of 0.6 μm. In the following, the electrolyte (or solid electrolyte) refers to the thus-obtained glass ceramics unless it is noted otherwise.

In the present specification, the measured average particle diameter is a value of $D_{50}$ (diameter at a cumulative volume percentage of 50%) measured by a laser diffraction method. And, specifically, the measurement device can be referred to a particle size distribution measurement device LS100Q or a submicron particle analyzer N5, manufactured by Beckman Coulter, Inc. Here, the average particle diameter is a value expressed on a basis of volume. Use of the above-mentioned measurement devices is selected according to a particle diameter of an object to be measured. When a maximum particle diameter of the object to be measured is less than 3 μm, measurement is made by using only the submicron particle analyzer N5. When a minimum particle diameter of the object to be measured is equal to or more than 0.4 μm, measurement is made by using the particle size distribution measurement device LS100Q.

(Preparation of Pellets)

The above-mentioned powder lithium ion phosphate (lithium phosphate) (manufactured by NIPPON CHEMICAL INDUSTRIAL CO., LTD.: Average particle diameter: 1 μm) were mixed and several kinds of mixtures having 0 to 0.20 wt % of lithium phosphate were prepared. These mixtures were mixed by a ball mill with alumina balls in dry condition for 24 hours. Two (2) grams of the thus-mixed mixture were set into a circular concave having a diameter of 30 mm of a tablet press machine and pressed with two (2) ton pressing force to form a tablet. The thus-formed tablet was placed on a alumina boat and fired in an air atmosphere at 950° C. for 10 hours.

Figure 2:
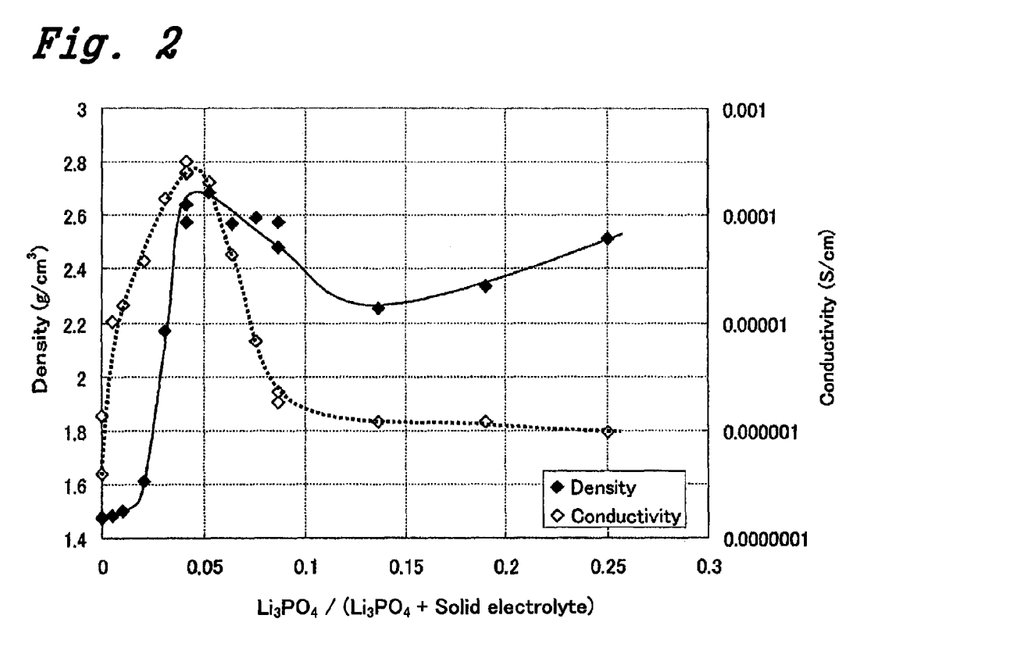
FIG. 2 shows a graph in which a relation between an amount of addition of a lithium phosphate additive and a density of a solid electrolyte pellet is plotted as well as a relation between the amount of addition of a lithium phosphate additive and a density of the solid electrolyte pellet.

After firing, each sample retaining a tablet shape was measured with respect to an outer diameter, thickness, and weight such that a bulk density thereof was calculated. Further, gold electrodes having a diameter of 13 mm were deposited on both top and bottom surfaces of each sample by a DC sputtering and an ion conductivity thereof was measured through an impedance measurement. As a result, a relation between an addition amount of lithium phosphate and a density thereof and a relation between the addition amount of the lithium phosphate and an ion conductivity are shown in FIG. 2.

(Results)

As shown in the figure, the density and the ion conductivity increased in accordance with an increase of the addition amount of the lithium phosphate in a range from 0.005 to 0.04 with respect to the addition amount of the lithium phosphate in the weight ratio of $(Li_3PO_4)/(Li_3PO_4+$powder lithium ion conductive glass ceramics)). The density of the fired tablets was almost constant in a range from 0.04 to 0.08 with respect to the addition amount of the lithium phosphate. On the other hand, the ion conductivity decreased in accordance with the increase of the addition amount of the lithium phosphate in a range from 0.05 to 0.08 with respect to the addition amount of the lithium phosphate. This might have been caused because the network might for the lithium ion conductivity was broken as the lithium phosphate existed excessively. Here, the fired tablets could not retain their disk shapes in the range where the weight ratio of the addition amount of the lithium phosphate exceeded 0.20. Here, the bulk density exhibits relatively low, but the ion conductivity exhibits relatively high in a range from 0.05 to 0.025 with respect to the addition amount of the lithium phosphate in the weight ratio of $((Li_3PO_4)/(Li_3PO_4+$powder lithium ion conductive glass ceramics)). Therefore, the ion conductivity was readily increased with a small addition of the sintering additive. In this range, a relatively high ion conductivity can be obtained with a relatively low density such that the range of addition amount may be useful if such properties are preferable for a solid state battery utilizing such electrolyte.

Here, the lithium phosphate added as the compound containing lithium (Li) can be detected as the trilithium phosphate by the powder X-ray diffractometry even after firing if the compound exits as is. When the addition amount of the lithium phosphate with respect to the addition amount of the lithium phosphate in the weight ratio of $((Li_3PO_4)/(Li_3PO_4+Li_{1+x+y}Al_xTi_{2-x}Si_yP_{3-y}O_{12}))$, the trilithium phosphate after firing was 0.04 in the weight ratio to the solid electrolyte.

Embodiment 2

Electrolyte (powder lithium ion conductive glass ceramics) and an sintering additive ($Li_3PO_4+LiNO_3$) were mixed and a binder and the like were added to the mixture. Then, the thus-obtained mixture was shaped in a precursor form and thereafter fired to prepare a solid electrolyte body. Such solid electrolyte bodies having the above-mentioned two kinds of sintering additives in varied ratios were prepared and bulk density and ion conductivity were evaluated.

(Preparation of Precursor Solid Electrolyte)

Solid electrolyte bodies were prepared by a green sheet method (a method of obtaining the thickness of a form using a raw sheet, known as the green sheet, before ceramics are sintered to it) and experiments were conducted. As shown in Table 1, a binder (N-3046 by YUKEN INDUSTRY CO., LTD.) of 30 g, a dispersant (N-1005 by YUKEN INDUSTRY CO., LTD.) of 1.5 g, and water of 20 g for 100 g of the sum of the electrolyte (powder lithium ion conductive glass ceramics) and the sintering additives were weighed and mixed by a ball mill utilizing alumina balls having a diameter of 10 mm. Here, $Li_3PO_4$ as the sintering additive to be used was the above-mentioned trilithium phosphate and respective addition amounts were 100 wt % (E2), 75 wt % (E3), 50 wt % (E4), 25 wt % (E5), and 0 wt % (E6). Further, $LiNO_3$ as the sintering additive to be used was the $LiNO_3$ (average particle diameter: 5 μm) manufactured by KOJUNDO CHEMICAL LABORATORY CO., LTD. And the ratio of the total amount of the sintering additives and the amount of the electrolyte (powder lithium ion conductive glass ceramics) was represented by the weight percentage of the total amount of the sintering additives over the total amount of the all and the ratios varied from 0 (E1) to 0.04 (E6). These sintering additives, electrolyte (powder lithium ion conductive glass ceramics), binder, dispersant, and water as summarized in Table 1 were blended with a defoaming agent (N-3301 by YUKEN INDUSTRY CO., LTD.) and the mixture was deformed with a planetary centrifugal vacuum mixer ARV-200 (by THINKY CORP.). Then, a film was formed on a separator film by a coater with a gap of 200 μm. The thus-obtained film was dried such that a solid electrolyte precursor was prepared in a green sheet form. In the following, these are referred to as E1 to E6, respectively.

TABLE 1

Composition of Electrolyte Layer Precursor

| | E1 | E2 | E3 | E4 | E5 | E6 |
|---|---|---|---|---|---|---|
| $Li_3PO_4$ (g) | 0 | 4 | 3 | 2 | 1 | 0 |
| $LiNO_3$ (g) | 0 | 0 | 1 | 2 | 3 | 4 |
| Powder solid electrolyte (g) | 100 | 96 | 96 | 96 | 96 | 96 |
| $\frac{Li_3PO_4 + LiNO_3}{Li_3PO_4 + LiNO_3 + \text{Powder solid electrolyte}}$ | 0 | 0.04 | 0.04 | 0.04 | 0.04 | 0.04 |
| Binder (N-3046) (g) | 30 | 30 | 30 | 30 | 30 | 30 |
| Dispersant N-1005 (g) | 1.5 | 1.5 | 1.5 | 1.5 | 1.5 | 1.5 |
| Water | 20 | 20 | 20 | 20 | 20 | 20 |

(Lamination and Firing Solid Electrolyte Precursor)

The thus-obtained solid electrolyte precursors E1 to E6 having a square shape with cm side were prepared. In each kind of sample E1, E2, E3, E4, E5, or E6, eight (8) sheets of the square shape were laminated and sandwiched by SUS plates with 7 cm side on the top and the bottom face. The laminate with the sheets and the plates were wrapped with rubber sheets and sealed in a vacuum-sealed package manner. Then, the sealed package was isostatically pressed at 196 MPa by a cold isostatic pressing machine (CIP). The thus-obtained laminates were punched out with a diameter of 30 mm and the cut out samples were fired in 100% nitrogen atmosphere at 960° C. for minutes to obtain samples 1 to 6.

All samples 1 to 6 were measured with their outer diameters, thicknesses, and weights so that their bulk densities were calculated. Further, gold electrodes having a diameter of 13 mm were deposited on both top and bottom surfaces of each sample by the DC sputtering and the ion conductivity thereof was measured through the impedance measurement. The results are summarized in Table 2.

TABLE 2

Effects of Electrolyte Composition on Ionic Conductivity and Density

| | Sample 1 | Sample 2 | Sample 3 | Sample 4 | Sample 5 | Sample 6 |
|---|---|---|---|---|---|---|
| | | | Electrolyte layer precursor | | | |
| | E1 | E2 | E3 | E4 | E5 | E6 |
| Thickness of electrolyte layer (μm) | 335 | 331 | 323 | 345 | 358 | 353 |
| Density (g/cm³) | 1.48 | 2.36 | 2.52 | 2.75 | 2.41 | 2.33 |
| Ionic Conductivity (×10⁻⁴ S/cm) | 0.01 | 0.88 | 0.92 | 1.05 | 0.90 | 0.76 |

(Identification of Fired Solid Electrolyte)

It was confirmed that each of the samples after firing included $Li_{1+x+y}Al_xTi_{2-x}Si_yP_{3-y}O_{12}$ (0≤x≤0.4, 0<y≤0.6) crystal by the powder X-ray diffractometry.

(Results)

The weight percent of the amount of the sintering additives of Sample 1 was 0 wt %. The density and the ion conductivity of the sample after firing were lower that those of the samples including the sintering additives. With respect to Samples 2 to 6, $Li_3PO_4$ and $LiNO_3$ as the sintering additives were added thereto respectively and amount ratios of $Li_3PO_4$ and $LiNO_3$ are varied as stated above. For any one of Samples 2 to 6, the lithium ion conductivity was increased to be about 100 times as high as that of what did not have any additives (Sample 1) and the bulk density was also increase to be about 1.6 times as high as that thereof.

Sample 4 including $Li_3PO_4$ and $LiNO_3$ with the equal weight ratio exhibited the highest performance such as highest bulk density and highest ion conductivity as compared to the other samples. Here, in consideration of densification mechanism in sintering, it is considered that a liquid phase might have been caused by the sintering additives during sintering such that a liquid-phase sintering effect was performed to accelerate the sintering. The melting points of $Li_3PO_4$ and $LiNO_3$ are 837° C. and 260° C., respectively. Although it is considered that the lower the melting point of the sintering additive becomes, the more preferable the sintering condition is to accelerate the sintering, it possible for $LiNO_3$ to be decomposed and removed at high temperatures. It is considered that the liquid phase effect may be achieved at lower temperatures by the sintering additives as the decomposition of $LiNO_3$ is prevented by adding the same amount ratio of $Li_3PO_4$ and $LiNO_3$.

Here, the lithium phosphate ($Li_3PO_4$) and the lithium nitrate ($LiNO_3$) added as the compound including lithium (Li) can be detected quantitatively as $Li_3PO_4$ and $LiTiOPO_4$ by the powder X-ray diffractometry after firing. When the addition amount of the lithium phosphate was 4 wt %, the amount of $Li_3PO_4$ and $LiTiOPO_4$ in the fired sample was supposed to become 0.05 in the weight ratio of the sum of the additives to the total weight of $Li_{1+x+z}M_x(Ge_{1-y}, Ti_y)_{2-x}Si_zP_{3-z}O_{12}$ as the lithium ion conductive crystal, $Li_3PO_4$, and $LiTiPO_4$. When the weight ratio of the addition amount of the lithium nitrate was 0.04 in the weight, the amount of $Li_3PO_4$ and $LiTiOPO_4$ in the fired sample was supposed to become 0.05 in the weight ratio of the sum of the additives to the total weight of $Li_{1+x+z}M_x(Ge_{1-y}, Ti_y)_{2-x}Si_zP_{3-z}O_{12}$, $Li_3PO_4$, and $LiTiPO_4$.

Embodiment 3

Figure 1:
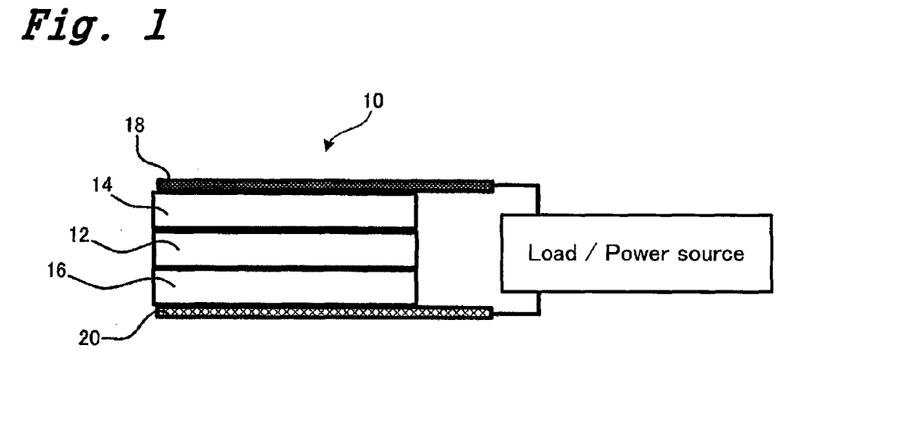
FIG. 1 is a schematic cross section view illustrating all solid state battery with respect to an embodiment of the present invention.

The battery properties were evaluated as an all solid state batter was configured as shown in FIG. 1. That is, the all solid state battery 10 was configured such that an inorganic solid electrolyte 12 was sandwiched by a negative electrode 14 and a positive electrode 16 being arranged across the inorganic solid electrolyte 12 in a up-and-down direction in the figure and leads were connected with the negative electrode 14 and the positive electrode 16. In this way, the all solid state battery 10 can be charged and discharged in terms of the current.

(Preparation of Positive Electrode Layer Precursor)

As the positive electrode material, $LiNiPO_4$ manufactured by KOJUNDO CHEMICAL LABORATORY CO., LTD. was milled by the planetary ball mill to attain the average particle diameter of 0.5 μm. Five gram (5 g) of $LiNiPO_4$ and 2.5 g of 20% aqueous sucrose solution were blended and then dried as they were being mixed. The dried power was placed into inside of a graphite crucible and graphite power was put over the placed powder near the top of the crucible without disturbing the placed powder. Then, the crucible was heated in a $N_2$ atmosphere at 650° C. for one hour such that $LiNiPO_4$ covered with carbon was obtained.

As shown in Table 3, the sum of 0.85 g of the solid electrolyte (powder lithium ion conductive glass ceramics) and the sintering additives ($Li_3PO_4$+$LiNO_3$), the amount of 0.15 g of acetylene black (DENKA BLACK, average particle diameter: 35 nm by DENKI KAGAKU KOGYO KABUSHIKI KAISHA) as a positive electrode additive, the amount of 0.9 g of a binder (N-3046 by YUKEN INDUSTRY CO., LTD.), the amount of 0.12 g of a dipersant (Serander F by YUKEN INDUSTRY CO., LTD.), the amount of 1.8 g of 1% aqueous carboxymethyl cellulose solution (1105 by DAICEL CHEMICAL INDUSTRIES, LTD.), and the amount of 0.25 g of styrene-butadiene rubber solution (XR-9026 by NIPPON A&L INC.), were mixed in a pot mill with alumina balls having a diameter of 10 mm such that a positive electrode slurry was obtained. Then, a film was formed by the coater with the gap of 200 μm such that a green sheet-like positive electrode precursor was obtained.

TABLE 3

Composition of Positive Electrode Layer Precursor

| | C1 | C2 | C3 | C4 |
|---|---|---|---|---|
| $LiNiPO_4$ (g) | 2 | 2 | 2 | 2 |
| Solid electrolyte (g) | 0.85 | 0.816 | 0.816 | 0.816 |
| $Li_3PO_4$ (g) | 0 | 0.034 | 0.017 | 0 |
| $LiNO_3$ (g) | 0 | 0 | 0.017 | 0.034 |
| Acetylene black | 0.15 | 0.15 | 0.15 | 0.15 |
| Binder (N-3046) | 0.9 | 0.9 | 0.9 | 0.9 |
| Dispersant(Serander F) | 0.12 | 0.12 | 0.12 | 0.12 |
| Carboxymethyl cellulose (1105) 1% solution | 1.8 | 1.8 | 1.8 | 1.8 |
| Styrene-butadiene rubber solution (XR-9026) | 0.25 | 0.25 | 0.25 | 0.25 |

(Preparation of Negative Electrode Precursor)

As shown in Table 4, graphite powder (average particle diameter: 3 μm by SEC Carbon, Ltd.), the mixture of the solid electrolyte (powder lithium ion conductive glass ceramics) and the sintering additives ($Li_3PO_4$+$LiNO_3$), and ethylene glycol were mixed at the weight ratios of 3:7:10 and the slurry thereof was prepared by mixing them in a pot mill with alumina balls having a diameter of 10 mm. After a sheet was formed by the coater with the gap of 200 μm, the sheet was stripped from the separator film such that the mixed powder was obtained. The-thus-obtained mixture powder of 1.5 g was placed into a circular concave with a diameter of 30 mm of the tablet press machine and pressed with two (2) ton pressing force to obtain a negative electrode layer precursor with a thickness of 1.5 mm.

TABLE 4

Composition of Negative Electrode Layer Precursor

| | A1 | A2 | A3 | A4 |
|---|---|---|---|---|
| Graphite (SGP3) (g) | 3 | 3 | 3 | 3 |
| Solid electrolyte (g) | 7 | 6.72 | 6.72 | 6.72 |
| $Li_3PO_4$ (g) | 0 | 0.28 | 0.14 | 0 |
| $LiNO_3$ (g) | 0 | 0 | 0.14 | 0.28 |
| Ethylene glycol (g) | 10 | 10 | 10 | 10 |

(Laminating and Firing Solid Electrolyte Precursor, Positive Electrode Layer Precursor, Negative Electrode Layer Precursor)

One sheet of the negative electrode layer precursor, three sheets of the electrolyte precursor, and one sheet of the positive electrode layer precursor were laminated in the order of the negative electrode layer precursor, the electrolyte precursor, and the positive electrode layer precursor. The shape of the laminate was a disk like having a diameter of 30 mm and a thickness of 1.6 mm. The laminate was sandwiched with the SUS plates and they were wrapped with rubber sheets and sealed in a vacuum-sealed package manner. Then, the sealed package was isostatically pressed at 196 MPa by the cold isostatic pressing machine (CIP). The thus-obtained laminates were fired in 100% nitrogen atmosphere at 960° C. for 10 minutes to obtain samples 7 to 10.

(Results)

Figure 3:
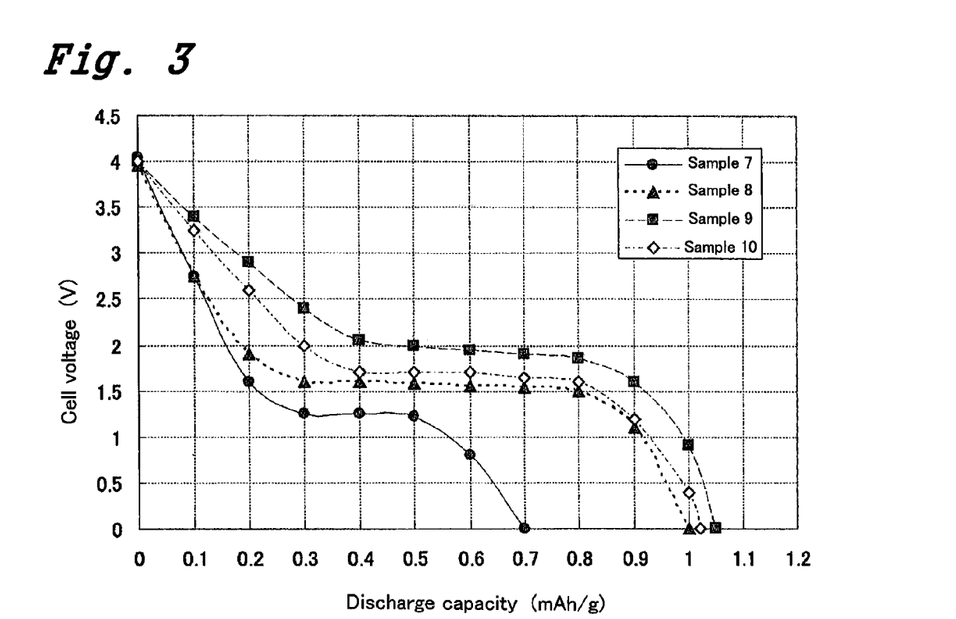
FIG. 3 shows a graph in which a relation between a discharge capacity and a cell voltage of the all solid state battery with respect to an embodiment of the present invention.
Figure 4:
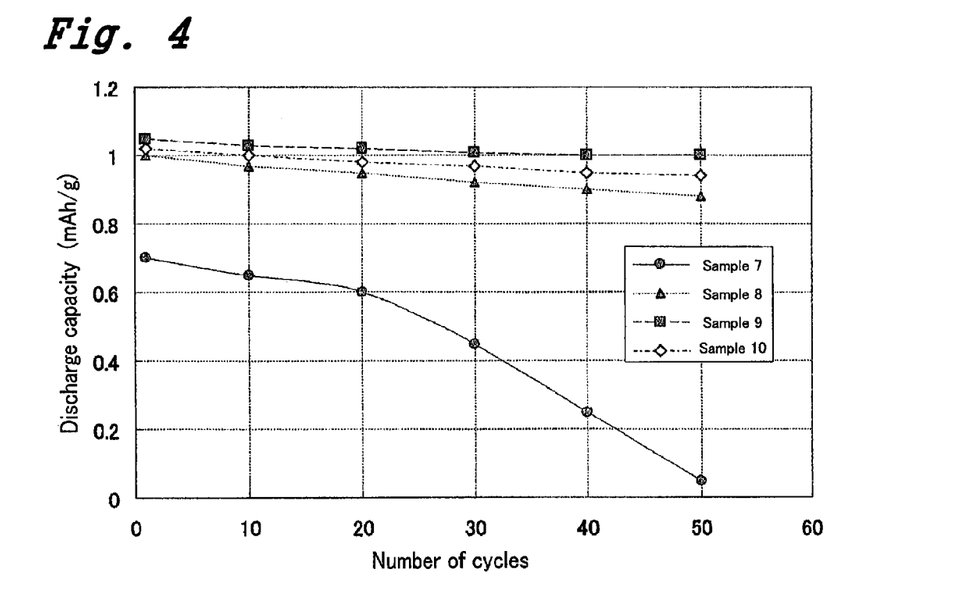
FIG. 4 shows a graph illustrating dependency of the number of charge-discharge cycles of the all solid state battery with respect to an embodiment of the present invention.

The charge-discharge properties were evaluated for the samples 7 to 10 prepared as mentioned above. The results are shown in Table 5, and FIG. 3 (Electrolyte dependency of charge-discharge properties) and 4 (Cycle dependency of charge-discharge properties).

TABLE 5

Charge-discharge properties of all solid state battery with various electrolyte configurations

| | Sample 7 | Sample 8 | Sample 9 | Sample 10 |
|---|---|---|---|---|
| Composition of electrolyte layer precursor | | | | |
| | E1 | E2 | E4 | E6 |
| Composition of negative electrode layer precursor | | | | |
| | A1 | A2 | A3 | A4 |
| Composition of positive electrode layer precursor | | | | |
| | C1 | C2 | C3 | C4 |
| Thickness of fired electrolyte layer (μm) | 0 | 1 | 2 | 3 |
| Thickness of fired negative electrode layer (μm) | 96 | 96 | 96 | 96 |
| Positive electrode collector | Al | Al | Al | Al |
| Negative electrode collector | Cu | Cu | Cu | Cu |
| Discharge capacity (mAh/g) | 0.7 | 1 | 1.02 | 1.05 |
| Retention rate of capacity after 40 cycles (%) | 36 | 90 | 95 | 92 |
| Discharge current density (mA/cm$^2$) | 0.01 | 0.1 | 0.1 | 0.1 |
| Charge current density (mA/cm$^2$) | 0.05 | 0.5 | 0.5 | 0.5 |
| Open-circuit voltage after charge (V) | 4.05 | 3.95 | 4.00 | 4.00 |

Sample 7 had only the solid electrolyte (powder lithium ion conductive glass ceramics) and no sintering additives were added. The resistance value of Sample 7 was high and the current density could not be increased as compared to those of Samples 8 to 10. Sample also had a low discharge capacity and it is considered that the network formation was not so successful. As shown in Table 2 of Embodiment 1, the lithium ion conductivity of the electrolyte layer (E1) of Sample 7 was relatively low. Further, it is inferred that the resistance of the lithium ion conductance in the electrolyte in the positive electrode (C1) and the negative electrode (A1) is high. Further, the retention rate of the capacity immediately after 40 cycles was not exceeding 40% such that it is inferred that contact interfaces between the electrolyte and the electrode active substance were separated due to the mechanical stress caused by the volume expansion and contraction because of the charge and discharge cycle such that the capacity may be lowered.

It can be inferred that the lithium ion conductive glass ceramic power was successfully sintered because the $Li_3PO_4$ was used as the sintering additives in the electrolyte layer (E2), the positive electrode layer (C2), and the negative electrode layer (A2) with respect to Sample 8. As compared to Sample 7 in which the sintering additives were not added, the charge and discharge can be made with the current density about 10 times as high as that of Sample 7 and the discharge capacity also exhibited 1 mAh/g, which might be about 1.4 times as high as the comparison. This is because the sintering of the electrolyte was accelerated due to the addition of the sintering additives and the lithium (Li) ion conductive network might have been spread wider.

Further, the retention rate of the capacity was 90% just after 40 cycles, which exhibits more than twice as compared to the samples without the addition of the sintering additives. This is because the respective amounts of $Li_3PO_4$ and $LiNO_3$ are equal in the electrolyte layer (E4), the positive electrode layer (C3), and the negative electrode layer (A3) such that the network on the negative electrode side became in a better condition than that of Sample 8. That is, the bond between the electrolyte and the negative electrode was mechanically strengthened because the $Li_3PO_4$ and the $LiNO_3$ intervened inbetween so as to perform such a function to suppress the mechanical stress therein due to the volume expansion and contraction during the charge and discharge cycle.

Sample 9 exhibited a high discharge capacity of 1.02 mAh/g, which is 1.5 times as high as that of Sample 7. In particular, the retention rate of the capacity was the highest (95%) at the 40th cycle. It is considered that the sintering was accelerated by the addition of the $LiNO_3$ to the $Li_3PO_4$ such that the bond between the negative electrode and the electrolyte was further strengthened in comparison of the case in which only $Li_3PO_4$ was added.

Sample 10 exhibited the highest discharge capacity as high as 1.05 mAh/g. It is considered that the nominal capacity was increased because the network of the electrolyte was spread in a wider range as compared to the case in which only $Li_3PO_4$ was added since the melting point of the $LiNO_3$ is as low as 560° C.

As mentioned above, the solid electrolyte material to which desirable sintering additives were added was sintered and densified such that the ion conductivity was also increased.

In addition to the above-mentioned embodiments, the present invention may include the following solid state battery and a manufacturing method thereof. An all solid state battery having a positive electrode layer and a negative electrode layer can be provided as the all solid state battery is characterized in that at least one of a solid electrolyte layer, the positive electrode layer, and the negative electrode layer contains a lithium ion conductive crystal and $A_xB_yO_z$, A being one or more selected from the group consisting of Al, Ti, Li, Ge, and Si, B being one or more selected from the group consisting of P, N, and C, wherein $1 \leq X \leq 4$, $1 \leq Y \leq 5$, and $1 \leq Z \leq 7$.

The solid state battery as described above can be provided as it is characterized in that an amount of the $A_xB_yO_z$ added to the at least one of the solid electrolyte layer, the positive electrode layer, and the negative electrode layer is from 0.001 to 0.10 in a weight ratio of $(A_xB_yO_z)/(A_xB_yO_z+$the lithium ion conductive crystal$)$.

Here, it is not necessary for the solid state battery to contain any organic or aqueous electrolyte. The containing amount of the above-mentioned $A_xB_yO_z$ is represented by a weight ratio of $A_xB_yO_z$ to the total weight of the $A_xB_yO_z$ and the lithium ion conductive crystal in the at least one layer. Therefore, the weight ratio is $(A_xB_yO_z)/(A_xB_yO_z+$the lithium ion conductive crystal$)$. It is preferable that the above weight ratio of the containing amount thereof is at least 0.001, it is more preferable that the weight ratio is at least 0.02, and it is further preferable that the weight ratio is at least 0.03. However, if the weight ratio is too high, the ion conductivity might be lowered because the network of the solid electrolyte may be prevented. Therefore, it is preferable that the weight ratio is not exceeding 0.10, it is more preferable that the weight ratio is not exceeding 0.07, and it is even further preferable that the weight ratio is not exceeding 0.06.

The weight of $A_xB_yO_z$ can be quantitatively measured by utilizing a peak corresponding to the compound $A_xB_yO_z$ in the powder X-ray diffraction measurement with mixed materials sampled evenly in a predetermined amount from the at lease one layer of the solid electrolyte layer, the positive electrode layer, and the negative electrode layer. The compound of $A_xB_yO_z$ has rather low meting point as compared to the material in the solid electrolyte, and it is considered that a liquid phase can be made readily so as to accelerate the sintering of the lithium ion conductive crystal. Therefore, it is considered that the densification is readily accelerated in the solid electrolyte layer including the lithium ions conductive crystal. Further in the positive electrode layer, it is considered that the lithium ion conductive crystal and the positive electrode active material and the electrolyte are bound with the compound $A_xB_yO_z$. In a similar manner, in the negative electrode layer, it is considered that the lithium ion conductive crystal and the negative electrode active material and the electrolyte are bound with the compound $A_xB_yO_z$. Therefore, it is possible to decrease the resistance in the charge-and-discharge properties and to improve the durability in the repeated charge-and-discharge cycles. In this way, it is considered that the compound $A_xB_yO_z$ is to work as the liquid phase to accelerate the sintering of the respective materials and to spread in grain boundaries of various kinds of compounds after the firing so as to work as a binding agent.

The solid state battery as described above and characterized in that the at least one of the solid electrolyte layer, the positive electrode layer, and the negative electrode layer is material including lithium which has a melting point of 1050° C. or less and is different from the lithium ion conductive crystal, the material being fired at a temperature of 1050° C. or less, can be provided.

That is, the above-mentioned compound including the lithium is a compound having a different structure and/or a different composition than those of the above-mentioned lithium ion conductive crystal such that the lithium ion conductivity may be $1 \times 10^{-5}$ S·cm$^{-1}$ or less. The compound may have one or more of $LiNO_3$, $Li_2CO_3$, $Li_3PO_4$, and $LiPO_4$, as the main phase and the lithium (Li) may be partially replaced with Al, Mg, Na, and K. Or, the compound may be a mixture of these materials. The lithium nitrate crystal belongs to the trigonal system and is not the lithium ion conductive crystal. The melting point of the compound is 1050° C. or less, and it is more preferable that the melting point is 1000° C. or less, and it is further preferable that the melting point is 950° C. or less. Further, if the melting point is too low, it may not work with full performance during the manufacturing process. It is preferable that the melting point is 200° C. or higher. It is more preferable that the melting point is 250° C. or higher. It is further preferable that that the melting point is 300° C. or higher. The compound may be decomposed depending on the firing atmosphere (e.g., in an inert atmosphere such as a nitrogen atmosphere). If the decomposition temperature is too low, the full performance may not be available in the manufacturing environment. Therefore, it is preferable that the decomposition temperature is 500° C. or higher, and it is more preferable that the decomposition temperature is 600° C. or higher, and it is further preferable that decomposition temperature is 700° C. or higher.

By including the above-mentioned compound, the compound may make a liquid phase on the grain surface of the lithium ion conductive crystal, and it is considered that the material transfer is accelerated in the lithium ion conductive crystal. Therefore, it is possible to densify the positive electrode layer, the negative electrode layer, and the solid electrolyte.

The solid state battery as described above can be provided as it is characterized in that the at least one of the solid electrolyte layer, the positive electrode layer, and the negative electrode layer contains the lithium ion conductive crystal and one or more selected from the group consisting of $Li_3PO_4$, $LiPO_4$, $LiNO_3$, $Li_2CO_3$, and $Li_2O$.

The solid state battery as described above can be provided as it is charcterized in that the lithium ion conductive crystal includes $Li_{1+x+z}M_x(Ge_{1-y}Ti_y)_{2-x}Si_zP_{3-z}O_{12}$, where $0 \leq x \leq 0.8$, $0 \leq y \leq 1.0$, and $0 \leq z \leq 0.6$, and that M is one or more selected from the group consisting of Al and Ga.

The solid state battery as described above can be provided as it is characterized in that the lithium ion conductive crystal is precipitated by a heat treatment from glass that contains in respective molar percents as in respective oxide forms:
  10 to 25 mol % of $Li_2O$,
  0.5 to 15 mol % of $Al_2O_3$ and/or $Ga_2O_3$,
  25 to 50 mol % of $TiO_2$ and/or $GeO_2$,
  0 to 15 mol % of $SiO_2$, and
  26 to 40 mol % of $P_2O_5$.

A solid electrolyte can be provided as described above, the solid electrolyte comprises a first inorganic material including a lithium ion conductive crystal or an inorganic component from which the lithium ion conductive crystal is precipitated by a heat treatment; a second inorganic material including one or more selected from the group consisting of 0.1 wt % to 10 wt % of $Li_3PO_4$, $LiPO_4$, $LiNO_3$, $Li_2CO_3$, and $Li_2O$, and wherein a mixture of the first and the second inorganic materials is fired at a temperature of 1050° C. or less.

The solid electrolyte as described above can be provided as it is characterized in that the lithium ion conductive crystal is a crystal of $Li_{1+x+z}M_x(Ge_{1-y}, Ti_y)_{2-x}Si_zP_{3-z}O_{12}$, and that $0 \leq x \leq 0.8$, $0 \leq y \leq 1.0$, and $0 \leq z \leq 0.6$, and that M is Al, Ga, or a combination thereof.

The solid electrolyte as described above can be provided as it is characterized in that the lithium ion conductive crystal is precipitated by a heat treatment from glass that contains in respective molar percents as in respective oxide forms:
  10 to 25 mol % of $Li_2O$,
  0.5 to 15 mol % of $Al_2O_3$ and/or $Ga_2O_3$,
  25 to 50 mol % of $TiO_2$ and/or $GeO_2$,
  0 to 15 mol % of $SiO_2$, and
  26 to 40 mol % of $P_2O_5$.

Here, it is preferable that the solid electrolyte is a material including $Li_{1+x+z}M_x(Ge_{1-y}, Ti_y)_{2-x}Si_zP_{3-z}O_{12}$ crystal wherein $0 \leq x \leq 0.8$, $0 \leq y \leq 1.0$, $0 \leq z \leq 0.6$ and M can be selected from Al, Ga, or a combination thereof since the electrolyte is chemically stable and the ion conductivity is high. Further, it is more preferable that powder glass ceramics in which the above crystal is precipitated or powder glass ceramics from which the above-referenced crystal may be precipitated is formed in a shape by the green sheet method (tape cast manufacturer) and sintered.

The glass ceramics from which a crystal of $Li_{1+x+z}M_x(Ge_{1-y}, Ti_y)_{2-x}Si_zP_{3-z}O_{12}$, is precipitated can be prepared as $0 \leq x \leq 0.8$, $0 \leq y \leq 1.0$, and $0 \leq z \leq 0.6$, and as M is Al, Ga, or a combination thereof. The glass ceramics can be provided by heat treating the glass containing the following compositions:
  10 to 25 mol % of $Li_2O$,
  0.5 to 15 mol % of $Al_2O_3$ and/or $Ga_2O_3$,
  25 to 50 mol % of $TiO_2$ and/or $GeO_2$,
  0 to 15 mol % of $SiO_2$, and
  26 to 40 mol % of $P_2O_5$.

Here, "mol % as a standard in an oxide form" is the way to show the composition to represent respective components thereof in cations are composed of oxides in a manner that all the charges of the cations are assigned to the charges of oxygen atoms such that the composition is composed of oxide constituents in mol %. Further, the "glass ceramics" is a material in which a crystalline phase may be precipitated by the heat treatment and it may be referred to as a material being constituted of non-crystalline solid and crystalline solid.

In the method of manufacturing a solid electrolyte, the inorganic material including a lithium ion conductive crystal or the inorganic material having a lithium ion conductive crystalline phase precipitated by the heat treatment; and a compound including lithium that is different from the lithium ion conductive crystal is expressed by the weight ratio in relation to the weight of the inorganic material are different from the lithium ion conductive crystal.

Here, the compound including the lithium may be one or more selected from the group consisting of $Li_3PO_4$, $LiPO_4$, $LiNO_3$, $Li_2CO_3$, and $Li_2O$. Further, the firing may be performed as the above-mentioned inorganic material is successfully sintered preferably at a temperature of 700° C. or higher, and more preferably at a temperature of 800° C. or higher, and further preferably at a temperature of 900° C. or higher. If the temperature is too high, unnecessary decomposition may occur such that it is preferable at 1050° C. or lower, it is more preferable at 1000° C. or lower, and it is further preferable at 960° C. or lower. The firing atmosphere may be, by way of example, but not limited to, an air atmosphere, an oxidizing atmosphere, a reducing atmosphere, and an inert atmosphere to be empolyed. The air atmosphere is preferable.

The method of manufacturing the solid electrolyte as described above can be provided in that the lithium ion conductive crystal is a crystal of $Li_{1+x+z}M_x(Ge_{1-y}, Ti_y)_{2-x}Si_zP_{3-z}O_{12}$, and in that $0 \leq x \leq 0.8$, $0 \leq y \leq 1.0$, and $0 \leq z \leq 0.6$, and in that M is Al, Ga, or a combination thereof.

It is possible to obtain a chemically stable solid electrolyte having a high lithium ion conductivity by including the above-mentioned crystalline. It is likely to densify the electrolyte by firing it together with one or more selected from the group consisting of $Li_3PO_4$, $LiPO_4$, $LiNO_3$, $Li_2CO_3$, and $Li_2O$.

The method of manufacturing the solid electrolyte as described above can be provided as it is characterized in that the inorganic material including the lithium ion conductive crystal or the inorganic component from which the lithium ion conductive crystal is precipitated by the heat treatment that contains in respective molar percents as in respective oxide forms:

10 to 25 mol % of $Li_2O$,
0.5 to 15 mol % of $Al_2O_3$ and/or $Ga_2O_3$,
25 to 50 mol % of $TiO_2$ and/or $GeO_2$,
0 to 15 mol % of $SiO_2$, and
26 to 40 mol % of $P_2O_5$.

Provided is a method of manufacturing a solid state battery comprising the steps of:

preparing at least one layer precursor of a solid electrolyte layer, a positive electrode layer, and a negative electrode layer by mixing an inorganic material including a lithium ion conductive crystal and/or an inorganic component from which the lithium ion conductive crystal is precipitated by a heat treatment; and a compound including lithium having a weight ratio to an amount of the inorganic material from 0.001 to 0.10, the compound being different from the lithium ion conductive crystal and having a melting point of 1000° C. or less, and forming such a mixture in a shape; and firing a laminate including the at least one layer precursor in an oxygen partial pressure of 0.21 atmosphere or less in a temperature range from 700 to 1050° C.

Here, the laminate including the precursor is constituted of at least two layers corresponding to neighboring layers in the fired all solid state battery that is produced by firing and is constituted of the positive electrode current collector layer, the positive electrode layer, the solid electrolyte layer, the negative electrode layer, and the negative electrode current collector in this order. Therefore, the laminate includes at least one layer precursor of the solid electrolyte layer, the positive electrode layer, and the negative electrode layer. The laminate may include a pre-fired layer. Therefore, the laminate may be consttuted of only precursors; or not only precursors. Here, the compound including lithium may include one or more selected from the group consisting of $Li_2PO_4$, $LiPO_4$, $LiNO_2$, $Li_2CO_3$, and $Li_2O$. These compounds are different from the above-mentioned lithium ion conductive crystal. The electrode active material and the conductive additive can be protected by firing the compact under the oxygen partial pressure of 0.21 atmosphere or less. The oxygen partial pressure of 0.21 atm or less refers to a partial pressure of the oxygen in 1 atmosphere. The atmosphere of 0.21 atm of the oxygen partial pressure may include at least one kind of gas selected from the group consisting $N_2$, $H_2$, He, Ar, $CO_2$, and $CH_4$.

The method of manufacturing the solid state battery as described above can be provided as it is characterized in that the lithium ion conductive crystal is a crystal of $Li_{1+x+z}M_x(Ge_{1-y}, Ti_y)_{2-x}Si_zP_{3-z}O_{12}$, wherein $0 \leq x \leq 0.8$, $0 \leq y \leq 1.0$, and $0 \leq z \leq 0.6$, and wherein M is Al, Ga, or a combination thereof.

The method of manufacturing the solid state battery as described above can be provided as it is characterized in that the inorganic material including the lithium ion conductive crystal or the inorganic component from which the lithium ion conductive crystal is precipitated by the heat treatment that contains in respective molar percents as in respective oxide forms:

10 to 25 mol % of $Li_2O$,
0.5 to 15 mol % of $Al_2O_3$ and/or $Ga_2O_3$,
25 to 50 mol % of $TiO_2$ and/or $GeO_2$,
0 to 15 mol % of $SiO_2$, and
26 to 40 mol % of $P_2O_5$.

As described above, in the all solid state battery of the present invention comprising at least one layer selected from the group of the solid electrolyte layer, the positive electrode layer, and the negative electrode layer. Therefore, the all solid state batter utilizing such an electrolyte is expected to perform very well. And the binding between the lithium ion conductive crystal and the electrode material can be strengthened. Therefore, it is possible to enhance the ion conductivity of the all solid state battery such that the life time of the charge-and-discharge cycling can be elongated.

What is claimed is:

1. A solid state battery comprising:
a lithium ion conductive solid electrolyte layer;
a positive electrode layer; and
a negative electrode layer,
wherein at least one of the solid electrolyte layer, the positive electrode layer, and the negative electrode layer contains a lithium ion conductive crystal and $A_XB_YO_Z$, A being one or more selected from the group consisting of Al, Ti, Li, Ge, and Si, B being one or more selected from the group consisting of P, N, and C, wherein $1 \leq X \leq 4$, $1 \leq Y \leq 5$, and $1 \leq Z \leq 7$,
an amount of the $A_XB_YO_Z$ added to the at least one of the solid electrolyte layer, the positive electrode layer, and the negative electrode layer is from 0.03 to 0.07 in a weight ratio of $(A_XB_YO_Z)/(A_XB_YO_Z+$the lithium ion conductive crystal).

2. The solid state battery according to claim 1,
wherein a compound including lithium which has a melting point of 1050° C. or less and is different from the lithium ion conductive crystal is added to the at least one of the solid electrolyte layer, the positive electrode layer, and the negative electrode layer, and
wherein the at least one of the solid electrolyte layer, the positive electrode layer, and the negative electrode layer is fired at a temperature of 1050° C. or less.

3. The solid state battery according to claim 1,
wherein the $A_XB_YO_Z$ contains one or more selected from the group consisting of $Li_3PO_4$, $LiPO_4$, $LiNO_3$, and $Li_2CO_3$.

4. The solid state battery according to claim 1,
wherein the lithium ion conductive crystal includes $Li_{1+x+z}M_x(Ge_{1-y}, Ti_y)_{2-x}Si_zP_{3-z}O_{12}$, where $0 \leq x \leq 0.8$, $0 \leq y \leq 1.0$, and $0 \leq z \leq 0.6$, and
wherein M is one or more selected from the group consisting of Al and Ga.

5. The solid state battery according to claim 1,
wherein the lithium ion conductive crystal is precipitated by a heat treatment from glass that contains in respective molar percents as in respective oxide forms:
10 to 25 mol % of $Li_2O$,
0.5 to 15 mol % of $Al_2O_3$ and/or $Ga_2O_3$,
25 to 50 mol % of $TiO_2$ and/or $GeO_2$,
0 to 15 mol % of $SiO_2$, and
26 to 40 mol % of $P_2O_5$.

6. A solid electrolyte comprising:
a first inorganic material including a lithium ion conductive crystal or an inorganic component from which the lithium ion conductive crystal is precipitated by a heat treatment;
a second inorganic material including one or more compounds selected from the group consisting of 0.1 wt % to 10 wt % of $Li_3PO_4$, $LiPO_4$, $LiNO_3$, $Li_2CO_3$, and $Li_2O$,
wherein a mixture of the first and the second inorganic materials is fired at a temperature of 1050° C. or less,
an amount of the second inorganic material added to the solid electrolyte layer is from 0.03 to 0.07 in a weight ratio of (total of the compounds)/(total of the compounds+the lithium ion conductive crystal).

7. The solid electrolyte according to claim 6,
wherein the lithium ion conductive crystal is a crystal of $Li_{1+x+z}M_x(Ge_{1-y}, Ti_y)_{2-x}Si_zP_{3-z}O_{12}$,
wherein $0 \leq x \leq 0.8$, $0 \leq y \leq 1.0$, and $0 \leq z \leq 0.6$, and
wherein M is Al, Ga, or a combination thereof.

8. The solid electrolyte according to claim 6,
wherein the lithium ion conductive crystal is precipitated by a heat treatment from glass that contains in respective molar percents as in respective oxide forms:
10 to 25 mol % of $Li_2O$,
0.5 to 15 mol % of $Al_2O_3$ and/or $Ga_2O_3$,
25 to 50 mol % of $TiO_2$ and/or $GeO_2$,
0 to 15 mol % of $SiO_2$, and
26 to 40 mol % of $P_2O_5$.

9. The solid state battery according to claim 2,
wherein the $A_xB_yO_Z$ contains one or more selected from the group consisting of $LiPO_4$, $LiNO_3$, and $Li_2CO_3$.

10. The solid state battery according to claim 2,
wherein the lithium ion conductive crystal includes $Li_{1+x+z}M_x(Ge_{1-y},Ti_y)_{2-x}Si_zP_{3-z}O_{12}$, where $0 \leq x \leq 0.8$, $0 \leq y \leq 1.0$, and $0 \leq z \leq 0.6$, and
wherein M is one or more selected from the group consisting of Al and Ga.

11. The solid state battery according to claim 3,
wherein the $A_xB_yO_Z$ contains one or more selected from the group consisting of $LiNO_3$ and $Li_2CO_3$.

12. The solid electrolyte according to claim 6
wherein the second inorganic material includes one or more selected from the group consisting of 0.1 wt % to 10 wt % of $LiNO_3$, $Li_2CO_3$, and $Li_2O$.

* * * * *